Figure 1:
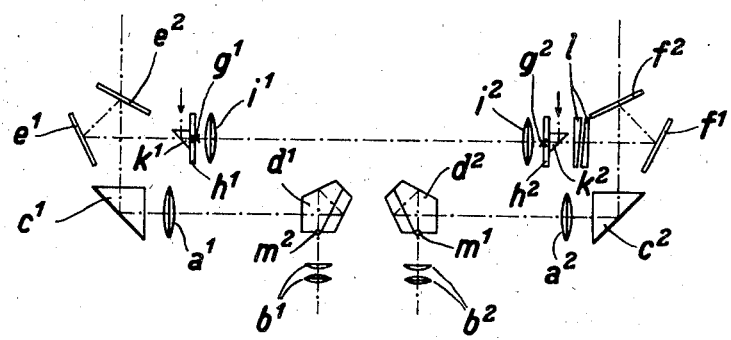

Jan. 17, 1939.　　　O. EPPENSTEIN　　　2,144,257

STEREOSCOPIC RANGE FINDER

Filed July 20, 1937

Inventor:

Otto Eppenstein

Patented Jan. 17, 1939

2,144,257

UNITED STATES PATENT OFFICE 2,144,257

STEREOSCOPIC RANGE FINDER

Otto Eppenstein, Jena, Germany, assignor, by mesne assignments, to Bausch & Lomb Optical Company, Rochester, N. Y., a corporation of New York Application July 20, 1937, Serial No. 154,572
In Germany July 27, 1936

2 Claims. (Cl. 88—2.7)

I have filed an application in Germany July 27, 1936.

Stereoscopic rangefinders are known which have two telescopes and a system of measuring marks consisting of real mark images produced by those optical parts of the telescopes which project the object images, the combination of the rays imaging the marks and the rays imaging the object being effected by optical squares on the object side of the ray entrance apertures of the telescopes. These optical squares are pentagonal prisms covering part of the ray entrance apertures of the telescopes and reducing accordingly the cross-sectional areas of the ray pencils imaging the object. In this constructional form of rangefinders, the combination of rays is, accordingly, a so-called geometrical combination.

Combining the rays geometrically entails the disadvantage that such images of the object and the marks are compared as are produced by different partial pencils of rays. As a consequence, the positions of the images produced in the rangefinder are generally so different that the measuring accuracy is noticeably influenced, the system of measuring marks of the rangefinder being, accordingly, not suitable for measuring the object images when the demands made upon measuring accuracy are high.

The invention overcomes this disadvantage in stereoscopic rangefinders of the said kind by using optical squares each of which consists of two plano-parallel plates having reflecting surfaces the dimensions of which correspond at least to those of the respective ray entrance apertures of the telescopes, the one reflecting surfaces of these squares being traversed by the entering imaging rays of the object and the other reflecting surfaces of the said squares being eventually so silvered as to be opaque. The combination of ray pencils effected in instruments of this kind is a so-called physical one. The cross-sectional areas of the ray pencils to be combined are equal to each other on account of the light entrance apertures of the telescope, which determine the cross-sectional areas of the entering imaging ray pencils of the object, determining the cross-sectional areas also of the pencils imaging the marks.

By reflection on those plates of the optical squares which are traversed by light, the intensity of the ray pencils imaging the object suffers a decrease which is not desired in itself. This decrease can be put up with, however, because it generally amounts to only approximately eight hundredths of the intensity. A corresponding quantity of light of the ray pencils is used for imaging the marks. The intensity can, however, be increased at will, since the marks are generally imaged by means of artificial sources of light of any desired intensities. If a considerable part of the intensity of light can be dispensed with in imaging the object, it is advisable to provide a transparent silver layer on those plates of the optical squares which are traversed by the ray pencils imaging the object. This layer may cover one of the, or both, surfaces of the said plates.

Figure 2:
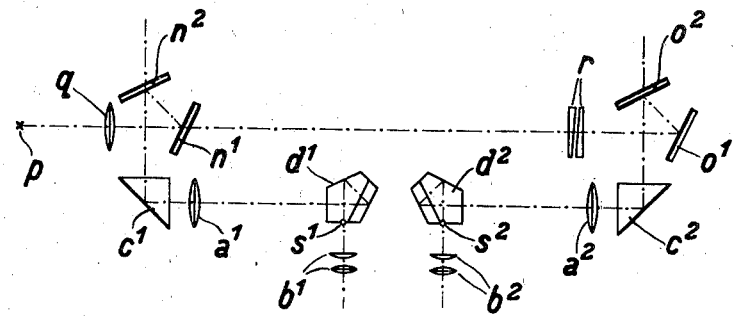

The accompanying drawing illustrates schematically two constructional examples of stereoscopic rangefinders according to the invention. Figures 1 and 2 show the optical parts of these rangefinders in plan sections.

Each of the rangefinders represented in the drawing consists of two telescopes having objectives $a^1$, $a^2$ and eye-pieces $b^1$, $b^2$. Near the exterior side of the objectives are disposed triangular prisms $c^1$, $c^2$ with opaque silvered bases. Between the objectives and the eye-pieces are pentagonal prisms $d^1$, $d^2$ each of which has a reflecting roof surface. Those light exit surfaces of the prisms $d^1$, $d^2$ which face the eye-pieces coincide with the planes in which objects at great distances are imaged by the objectives $a^1$, $a^2$. The said planes coincide also with the image planes of the eye-pieces.

On the object side of the triangular prisms $c^1$, $c^2$ of the first construction example (Figure 1) are disposed optical squares which consist of two plano-parallel unsilvered glass plates $e^1$, $e^2$ and $f^1$, $f^2$, respectively. Between these optical squares are two collimators consisting of glass plates $h^1$ and $h^2$, marks $g^1$ and $g^2$, and collimator objectives $i^1$ and $i^2$, respectively. To the exterior sides of the glass plates $h^1$ and $h^2$ are cemented small triangular prisms $k^1$, $k^2$ for directing laterally incident light to the marks $g^1$ and $g^2$. In the ray path between the glass plate $h^2$ and the optical square $f^1$, $f^2$ is disposed a pair of rotating wedges $l$.

The mark $g^1$ illuminated by means of the prism $k^1$ is imaged by the objective $i^2$ at a great distance. The pencil of imaging rays traverses the glass plate $h^2$ and the rotating wedges $l$, subsequently whereto it arrives on the plate $f^1$ and is reflected to the plate $f^2$. On this plate $f^2$ the said pencil is reflected again and, at the same time, combined with the ray pencil having traversed this plate $f^2$ and imaging the object of the one telescope. These two pencils are caused by the objective $a^2$ to produce images in the image plane of the eye-piece $b^2$. The image of the mark $g^1$ is designated $m^1$. By way of the objective $i^1$, the optical square $e^1$, $e^2$, the prism $c^1$, the telescope objective $a^1$ and the prism $d^1$, an image $m^2$ of the mark $g^2$ is produced in the image plane of the eye-piece $b^1$, the combination of the two pencils of imaging rays taking place on the plate $e^2$ traversed by the rays imaging the object. The free apertures of the objectives $a^1$ and $a^2$ determine the cross-sectional areas of the pencils of imaging rays, because the triangular prisms $c^1$, $c^2$ as well as the plates $e^1$, $e^2$ and $f^1$, $f^2$ are assumed to be so great as not to restrict the cross-sectional areas. The direction of the pencil of rays imaging the mark $g^1$ can be changed by rotation of the wedges $l$. This change entails a sideward displacement of the image $m^1$ in the field of view of the eye-piece $b^2$. The stereoscopic combination of the two mark images $m^1$, $m^2$ produces a stereoscopic measuring mark the apparent distance of which depends on the lateral position of the mark image $m^1$. This stereoscopic mark serves in the known manner for determining the distance of the object stereoscopically imaged by combination of the two object images.

Contrary to the first constructional example, in which the plates $e^1$, $e^2$ are symmetric to the plates $f^2$, $f^2$ with respect to the central plane of the instrument, which is at right angles to that of the drawing, the instrument according to the second constructional example (Figure 2) has reflecting plates $n^1$ and $n^2$ parallel to plates $o^1$ and $o^2$, respectively. The plates $n^1$, $n^2$ and $o^2$ have a thin silver layer on both sides, and the plate $o^1$ has an opaque silver layer on one side. The mark system is a collimator which comprises an illuminated mark $p$ and a collimator objective $q$. A pair of rotating wedges $r$ is placed in the ray path near the plate $o^1$.

The mark $p$ is imaged by the objective $q$ at a great distance. The imaging rays strike first the plate $n^1$, which divides them in such a manner that the one part of these rays are directed to the plate $n^2$, whence this one part as well as the rays imaging the object that have traversed this plate $n^2$ are transmitted via the prism $c^1$ to the objective $a^1$. The other part of the imaging rays striking the plate $n^1$ traverse this plate without being reflected and, subsequently to having gone through the rotating wedges $r$, they strike the plate $o^1$, whence they are reflected to the plate $o^2$. Here, the collimator rays are combined with those rays imaging the object which have traversed the plate $o^2$, the combined rays striking the prism $c^2$, which directs them to the objective $a^2$. The objectives $a^1$ and $a^2$ produce images $s^1$ and $s^2$, respectively, of the mark $p$. These images lie in the focal planes of the eye-pieces $b^1$ and $b^2$, and their stereoscopic combination provides the stereoscopic mark to be used for measuring the range of the object. The apparent distance of this measuring mark can be changed by rotating the wedges $r$. The dimensions of the plates $n^1$, $n^2$ and $o^1$, $o^2$ correspond to those of the plates $e^1$, $e^2$ and $f^1$, $f^2$ of the first constructional example.

I claim:

1. An optical system for stereoscopic range-finders, comprising two telescope systems each of which consists of an objective, an eye-piece and a reflecting system for deviating the pencils of imaging rays at two right angles, said optical system comprising further at least one mark, optical means for imaging said mark and optical means for deflecting a ray pencil at a variable angle, said imaging means containing two optical squares on the object side of the ray entrance apertures of said telescope systems, each of said optical squares consisting of two reflecting plano-parallel glass plates, the reflecting surfaces of said glass plates being in size and form at least equal to the respective ray entrance apertures of said telescope systems, the pencil of imaging rays of each of said telescope systems traversing one of the glass plates of said optical squares, the pencils of imaging rays of said optical means traversing said telescope systems, and said deflecting means being traversed by one of the two pencils entering one of said optical squares.

2. In an optical system according to claim 1, the plano-parallel glass plates traversed by the pencils of imaging rays of said telescopes being provided with transparent optical layers.

OTTO EPPENSTEIN.